United States Patent [19]

Black

[11] 4,148,295

[45] Apr. 10, 1979

[54] HORIZONTALLY MOUNTED SOLAR COLLECTOR

[75] Inventor: Dolphus H. Black, Owens Cross Roads, Ala.

[73] Assignee: The United States of America as represented by the Administrator of the National Aeronautics and Space Administration, Washington, D.C.

[21] Appl. No.: 823,061

[22] Filed: Aug. 9, 1977

[51] Int. Cl.² ............................................. F24J 3/02
[52] U.S. Cl. .................................... 126/270; 126/271
[58] Field of Search .............. 126/270, 271; 237/1 A; 60/641

[56] References Cited

U.S. PATENT DOCUMENTS

| 811,274 | 1/1906 | Carter | 126/271 |
|---|---|---|---|
| 4,030,890 | 6/1977 | Diggs | 126/271 |
| 4,040,411 | 8/1977 | Rust | 126/271 |

*Primary Examiner*—Kenneth W. Sprague
*Attorney, Agent, or Firm*—George J. Porter; John R. Manning; L. D. Wofford, Jr.

[57] ABSTRACT

A horizontally mounted solar collector for collecting solar energy utilizing a vertical deflector assembly, a stationary reflector and a collector. The deflector assembly contains a plurality of vanes which change the direction of the solar energy to the vertical, while constantly keeping the same side of the deflector facing the sun. The vertical rays are then reflected off the stationary reflector and are then absorbed by the collector.

8 Claims, 13 Drawing Figures

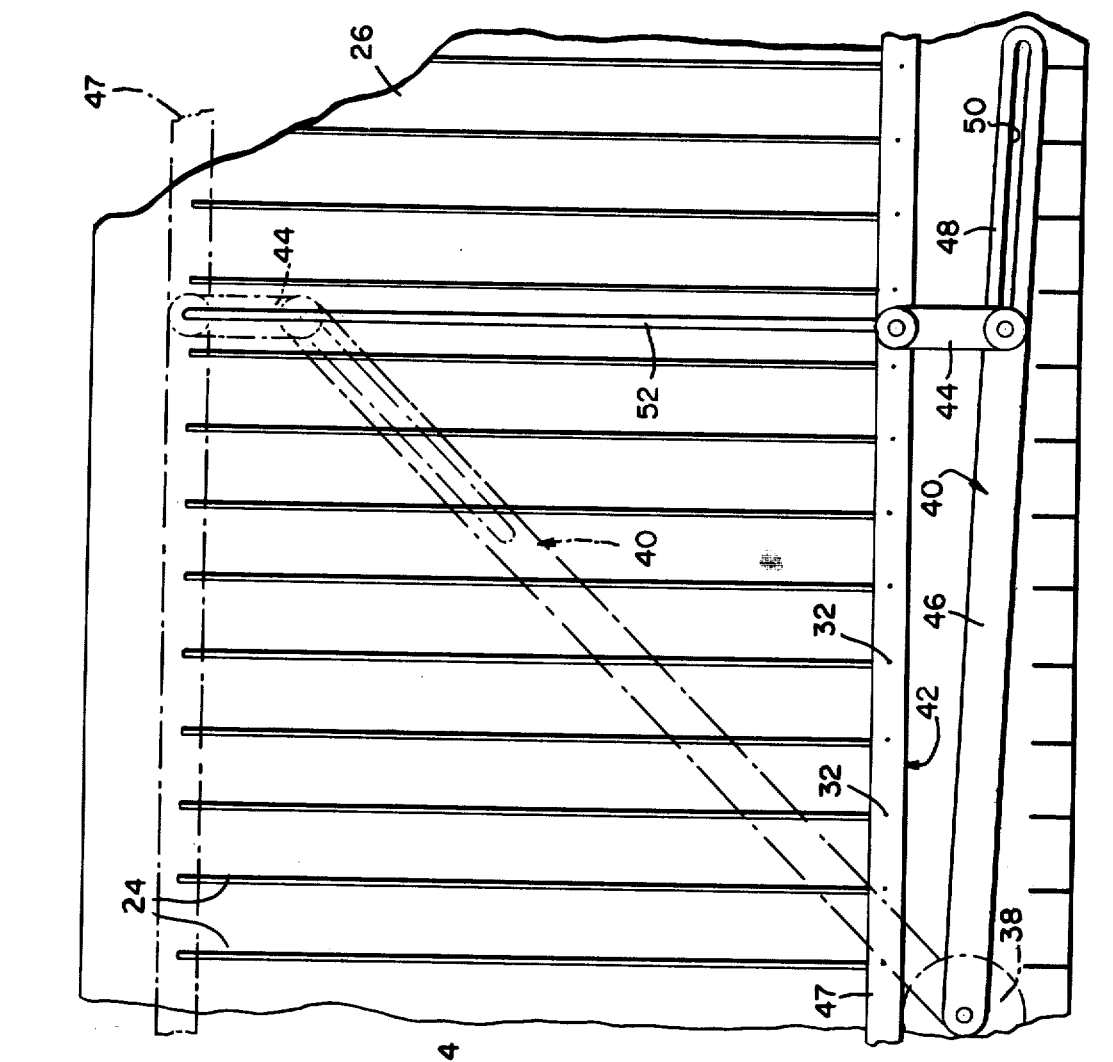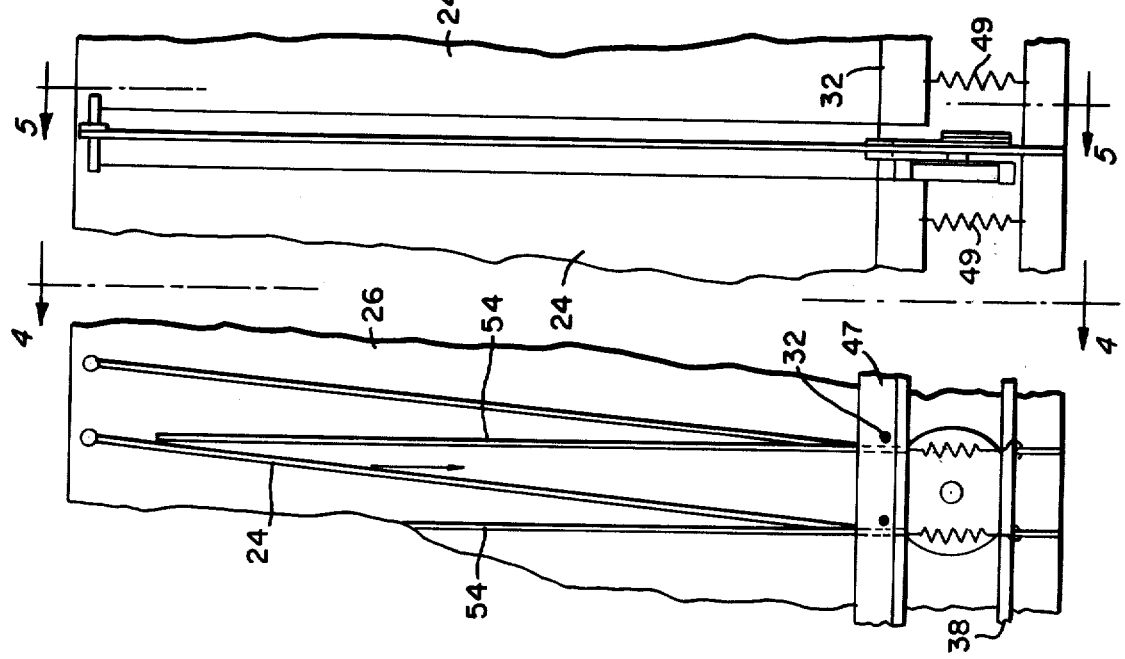

HORIZONTALLY MOUNTED SOLAR COLLECTOR

ORIGIN OF THE INVENTION

The invention described herein was made by an employee of the United States Government and used by or for the Government for governmental purposes without payment of any royalties thereon or therefor.

FIELD OF THE INVENTION

The present invention is directed to a device for collecting solar energy without utilizing a rotating reflector.

BACKGROUND OF THE INVENTION

The known prior art of solar collection includes collectors which must always be pointed directly at the sun. While these collectors are reasonably efficient, they have the disadvantage of requiring repositioning as the sun moves across the sky thereby increasing the cost and restricting the practical size of the collector. This size restriction increases the number of collectors required for power plants and the cost of the solar collecting assembly. Additionally, many of the solar collection schemes either built as prototypes or as conceptualized models, include collectors that are pointed at the sun via a motorized assembly. While these collectors are efficient by virtue of their sophisticated tracking mechanisms, they are limited to some practical (usually small) size to reduce strain on the tracking motors. To offset the increased number of collectors needed to equal the collection efficiency of a much larger tracking collector, a greater number of solar collectors is required. This increases the total cost of the solar collecting array and also is a less efficient scheme, especially when used to generate large quantities of energy as at a commercial electrical generating plant.

Representative of the prior art is U.S. Pat. No. 3,906,927 issued to Harry Caplan. This patent describes a solar-thermal power system employing adjustable curvature reflective panels. The reflective panels are movably supported on yoke structures allowing the panels to be moved as the sun assumes a plurality of positions in the sky. Each of these panels includes a plurality of individual panels which extend in a side-by-side relationship to form a substantially continuous surface. The individual panels are secured to support members by a plurality of threaded rods received by apertured plywood gusset plates. The individual panels are moved toward and away from the support members through the use of adjustment nuts, thereby achieving fine tuning of the reflector surface curvature. Course tuning of the reflects is accomplished by a motor which operates to automatically keep the reflectors properly aligned.

A second prior art reference directed to an apparatus for collecting solar energy is U.S. Pat. No. 3,884,217 issued to Lloyd Wartes. This patent shows a collecting system employing a plurality of individual reflector units which rotate about their horizontal axis of elongation as the elevation of the sun changes, thereby maintaining a convergence of the reflected rays at the receiving means. Similarly, the U.S. Pat. No. 1,386,781 issued to Walter Harvey describes a solar energy collection system utilizing a number of reflects to "track" the sun.

U.S. Pat. Nos. 412,724; 509,390; 1,367,472; 2,969,918; 3,466,119 and 3,905,352 describe solar heaters which employ movable reflectors. No patent or other prior art reference was discovered in which the reflectors remain substantially immovable and a plurality of vanes are utilized to direct the solar energy in a vertical direction to the reflectors in an economical and efficient manner. The art cited herein is the closest prior art known to the Applicant.

SUMMARY OF THE INVENTION

The present invention is directed to a method and apparatus for collecting solar energy in an economical and efficient manner. This apparatus includes a horizontally mounted solar collector utilizing a vertical deflector assembly, a stationary reflector and a collector. The deflector assembly contains a plurality of vanes which alter the direction of the solar energy to the vertical, while constantly keeping the same side of the deflector facing the sun. The vertical rays are then reflected off of the stationary reflector and are then absorbed by the collector. This particular configuration reduces the cost of the reflector by enabling the reflector to remain relatively immobile while still allowing the reflector to be adjusted for fine focusing.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3A is a sectional view of one embodiment of the vertical deflector taken through lines 3A—3A;

FIG. 4 is a sectional view of the first embodiment of the vertical deflector taken through lines 4—4;

FIG. 5 is a sectional view of the first embodiment of the vertical deflector taken through lines 5—5;

DESCRIPTION OF A PREFERRED EMBODIMENT

Figure 1:
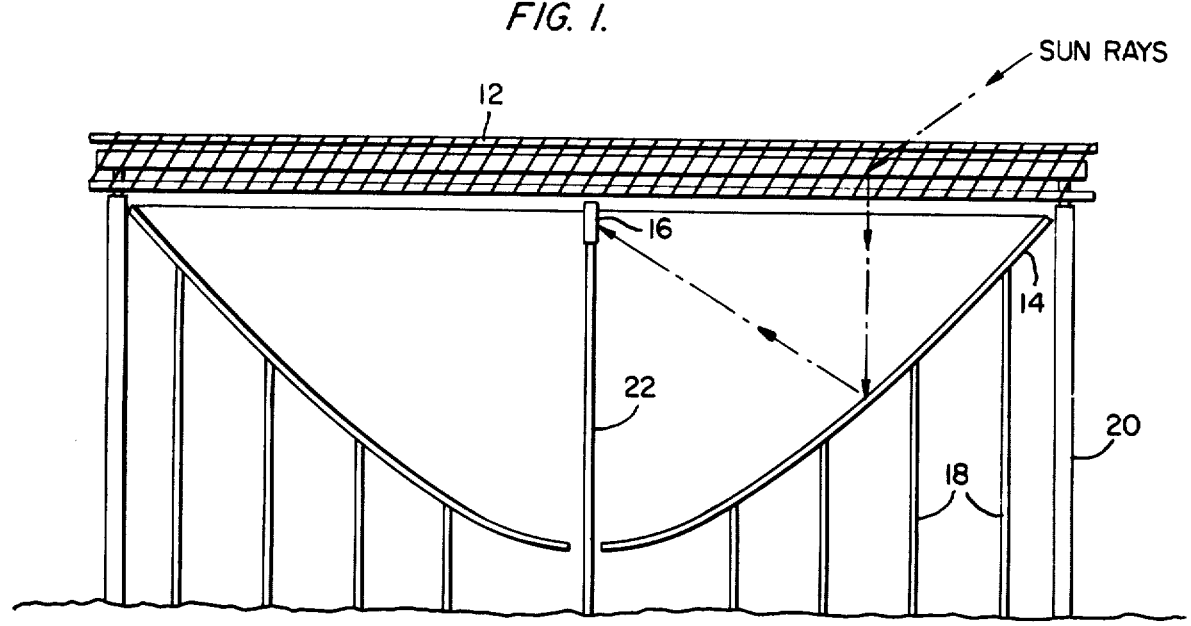
FIG. 1 is a side view of the horizontally mounted solar collector.

As shown in FIG. 1, the solar energy collection apparatus 10 of the present invention consists of a vertical deflector 12, a reflector assembly 14 and a collector 16. The reflector assembly 14 consists of a plurality of reflector plates constructed of standard reflectional material. The plates are attached to a collection apparatus frame including vertical supports 18. The plates are conical so that the solar energy will be focused to the center of a reflector member contained upon the collector 16. The collector 16 is supported within the collection apparatus by a sturdy support 22 constructed of any heavy duty, light-weight material. Alternatively, the support 22 can be eliminated entirely and the collector 16 itself may be utilized as both a collecting and supporting member.

Figure 2:
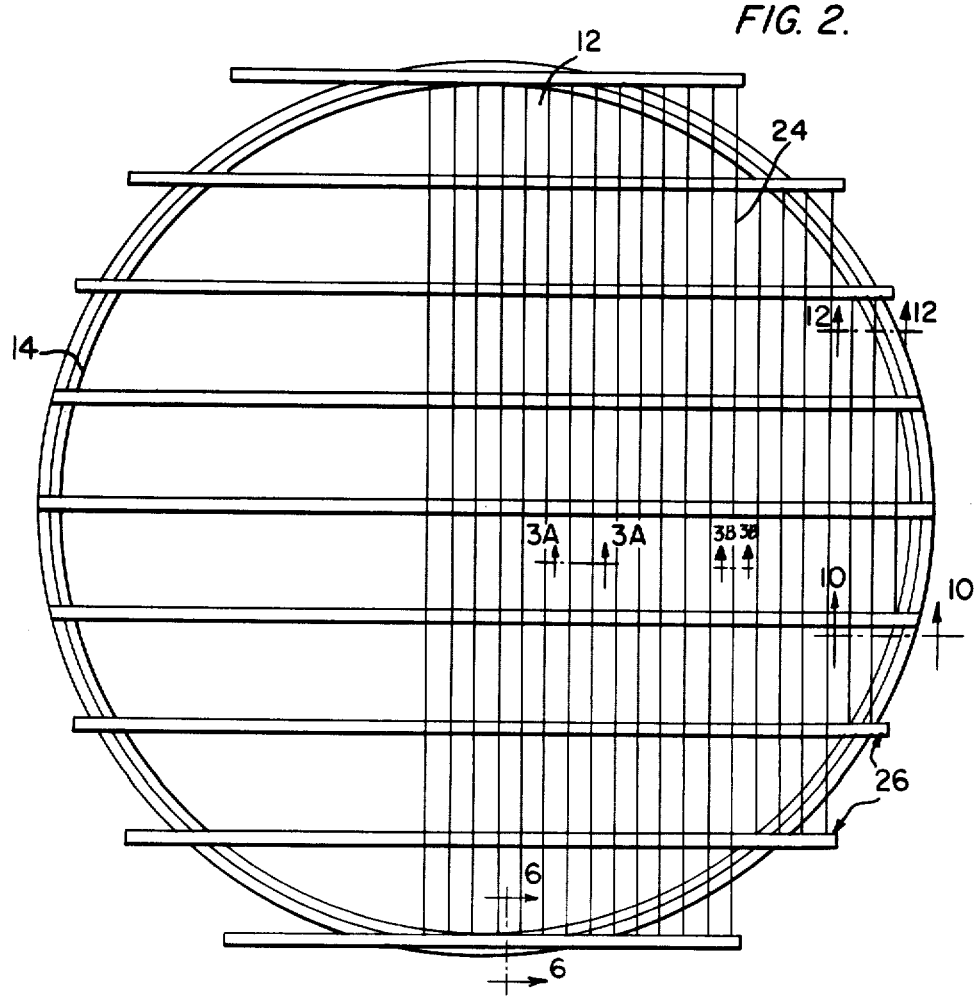
FIG. 2 is a plan view of the vertical deflector.
Figure 3B:
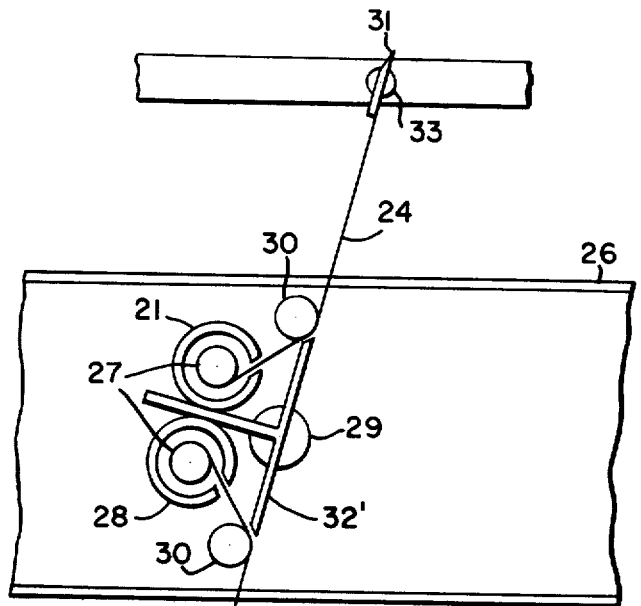
FIG. 3B is a sectional view of a second embodiment of the vertical deflector taken through lines 3B—3B.
Figure 6:
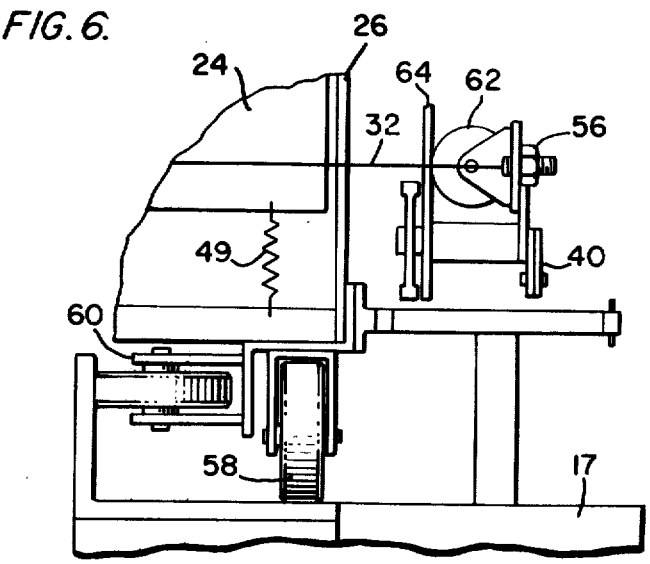
FIG. 6 is a sectional view of the first embodiment of the vertical deflector taken through lines 6—6.
Figure 9:
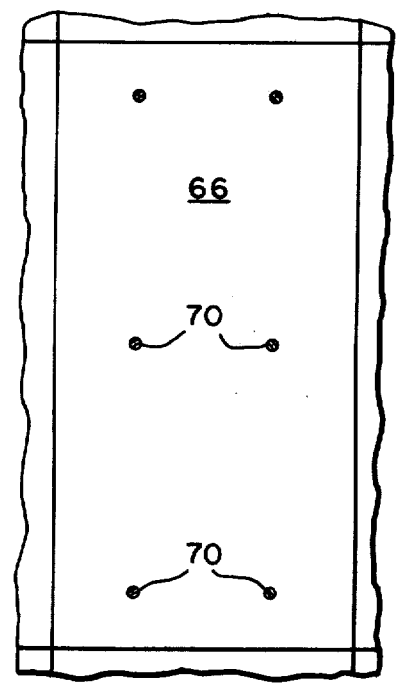
FIG. 9 is a sectional view of the reflector taken through lines 9—9.
Figure 8:
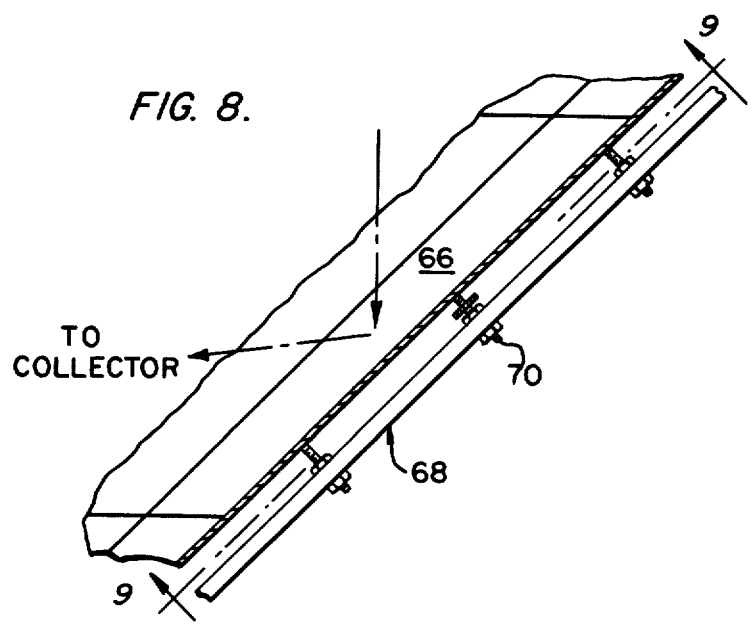
FIG. 8 is an elevational view of a portion of the reflector and support assembly.
Figure 12:
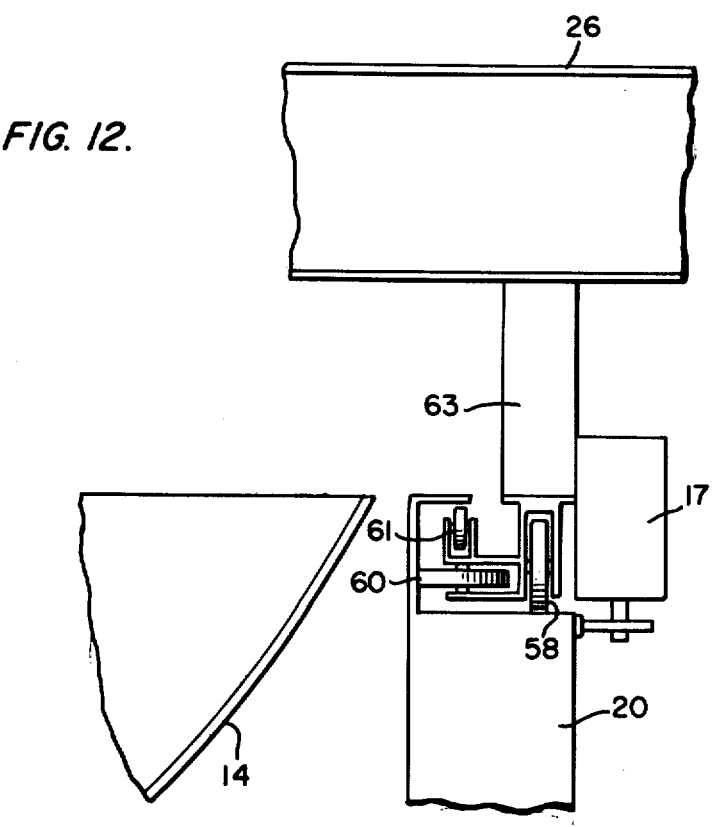
FIG. 12 is a sectional view of the second embodiment of the vertical reflector taken through lines 12—12.

The vertical deflector 12 (best shown in FIG. 2) changes the direction of the incoming solar energy to vertical and consists of a flat horizontal mounted structure having a number of vanes 24. These vanes are roll-out slats containing reflective material on one side and non-reflective material on the other side. These vanes change the direction of the solar energy from any incoming angle of incidence to vertical (90°). The vanes traverse the entire area of the deflector 12, although, for simplicity sake, only a portion of the vanes are shown in FIG. 2. Vertical deflector 12 is a flat horizontally mounted surface containing a number of parallel cross beams 26, each cross beam being perpendicular to the vanes 24. Each vane 24 consists of a flexible material having a reflective and non-reflective side. The vanes 24 extend from one cross beam 26 to another cross beam. The vertical deflector 12 is rotated to keep the same side of the deflector facing the sun at all times and is powered by a motor 17 (FIGS. 6 and 12). This allows the entire structure to rotate approximately 180° and back to the starting position each day.

As the structure rotates to follow the sun, the angle of the vanes 24 is changed to direct the solar rays down to the reflector 14. For efficient operation, it has been discovered that the vane angle should vary between 5° and 80° (maximum sun angle). An automatic tracking system (not described herein) tracks the sun and changes the angle of the vanes accordingly.

FIGS. 3A, 4, 5 and 6 show one embodiment in which the angle of the vanes 24 are altered. This angle is changed through the use of wires, string or twine or any other elongated flexible member 32. These wires are attached to the vanes 24 (one wire for each row of vanes) and move in a vertical plane. The wires are moved through the use of an electric vane position motor driving a drive shaft. The drive shaft cuts the deflector 12 roughly in half and is attached to a drive chain 38 on each of the cross beams 26.

As shown in FIGS. 4 and 5, the drive chain 38 rotates a vane position arm 40 which in turn moves a vane position plate 42. The vane position arm 40 contains a front piece 46 and an end piece 48, with end piece 48 containing a slot or groove 50 therein. A swivel pin 44 is connected between the vane position arm 40 and the vane position plate 42 and is allowed to slide in the slot or groove 50 of end piece 48. Vane position plate 42 is restricted to only vertical movements through the movement of the swivel pin 44 in a guide slot 52, said guide slot located in the cross beam 26. One wire 32 for each row of vanes is routed through wire slots 54 in the cross beams 26 and vane position plates 42. The angle (and therefore the height) of the vanes 24 is controlled by the vertical movement of the vane position plates 42. The height of the vanes 24 is determined by the maximum sun angle. As shown in FIG. 5, the vane position arm 40 and vane position plate 42 can be rotated from the position denoted in solid lines to a position denoted by the dashed lines.

The wires 32 are of standard strength and gauge and are kept at a predetermined tension through the use of wire adjustment bolts 56, located along one side of the flat surface of the vertical deflector 12. Vertical movement of the wires is made easier by rollers 62 situated between an outside vane position plate 64 and the flat surface of the vertical deflector 12. It can appreciated that there are wire adjustment bolts 56 and rollers 62 for each of the wires. The vanes are kept at a predetermined tension by springs 49 which are attached between the lower edge of the vane and the cross beams 26.

As shown in FIG. 6, rollers 58 and 60 are used to absorb any horizontal or vertical loads incurred by the vertical deflector of the first embodiment. Additionally, as shown in FIG. 12, the second embodiment includes rollers 58 and 60 as well as roller 61 for incurring any loads presented by the wind.

FIGS. 3B, 10, 11 and 12 show the second embodiment of the vertical deflector. In this embodiment, the vane angle is changed through the use of vane control arms 25 (FIG. 3B) located above and below each cross beam 26. These arms 25 extend and retract the vanes 24. Each vane 24 is attached to a vane support plate 31, which extends between the vane control arms 25, and attaches to the vane controls 25 through the use of vane support bearings 33. These bearings 33 allow the vanes 24 to rotate and change their angle with respect to the horizontal as the incoming sun angle changes. One end of the vane 24 is attached to a "window shade" type spring loaded roller 27 located inside a slotted cylinder 28. This protective cylinder is placed around the roller for protecting the vane from environmental hazards such as hail, sleet, freezing rain and dust. Two rollers 27 and cylinders 28 are attached to a frame 32', for each vane 24 that extends between the cross beams 26. A guide 30 extends the width of the vane 24 and serves as a direction change guide to the vane 24. This frame 32 with the rollers 27, cylinders 28 along with guides 30 are attached to the cross beams 26 by support bearings 29 which allows the frame 32' to rotate as the vane control arms 25 are extended and retracted. A reflective surface is provided on one side of the frame 32' to assist the vane 24 in deflecting the sun rays.

Figure 7:
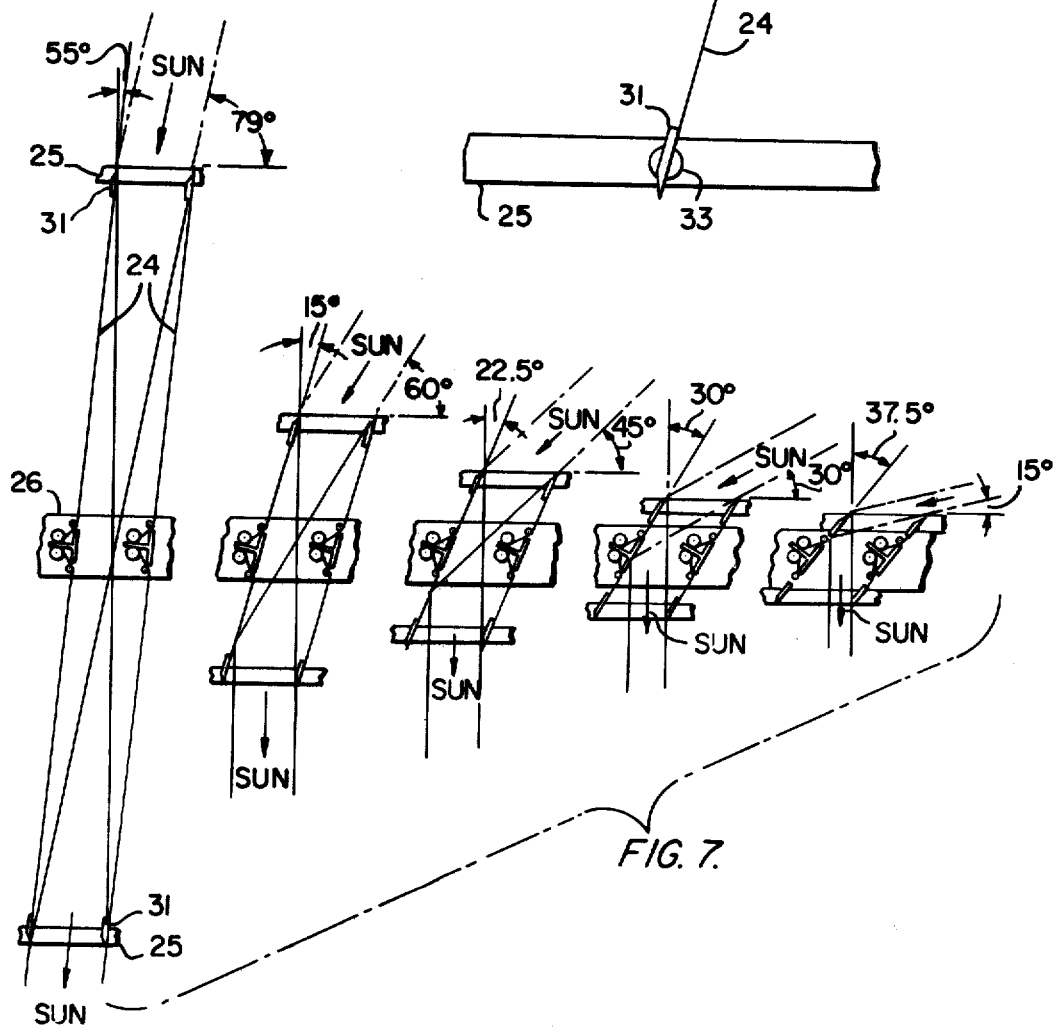
FIG. 7 shows various vane angles according to the position of the sun utilizing the second embodiment of the vertical deflector.
Figure 10:
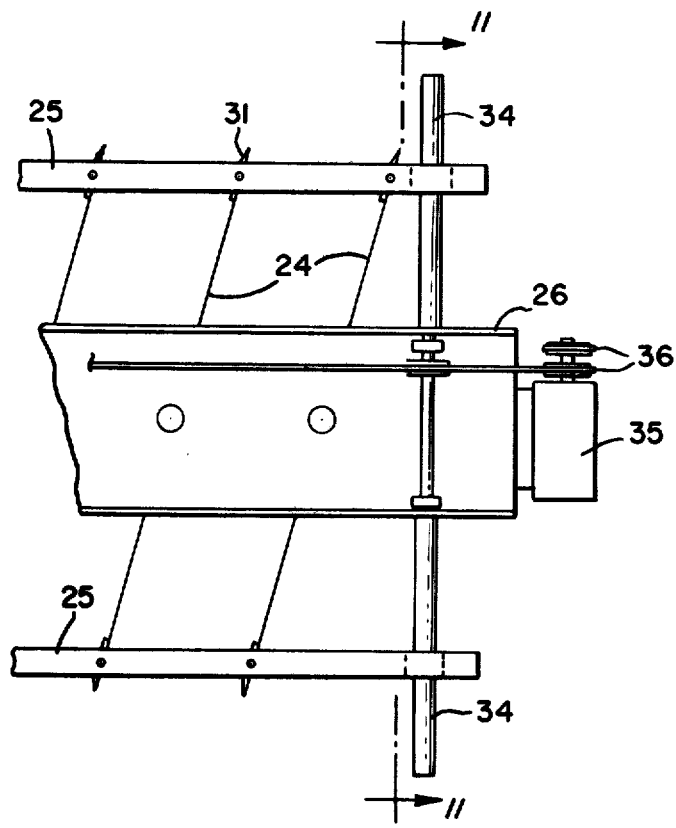
FIG. 10 is a sectional view of the second embodiment of the vertical deflector taken through lines 10—10.
Figure 11:
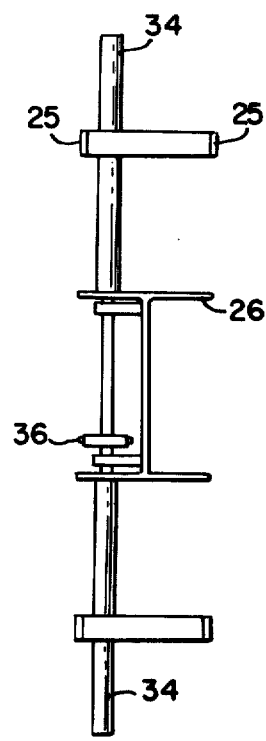
FIG. 11 is a sectional view of the second embodiment of the vertical deflector taken through lines 11—11.

As shown in FIGS. 10 and 11, the vane support plates 25 are extended and retracted by spline rotating shafts 34 that are driven by a motor 35 and chain drives 36. The angle of the vanes 24 are changed to deflect the sun rays to a vertical direction, as shown in FIG. 7, when the vane control arms 25 are extended and retracted.

The reflector assembly 14 consists of many large (each approximately 4'×8') plates 66 located on a support frame 68. The plates 66 are attached to frame 68 with adjustment bolts 70 that allow each plate 66 to be adjusted for the proper focus. The focusing is accomplished by using a vertical light at night and adjusting the reflection plate 66 to focus on the collector 16. Plates 66 are conical in configuration so that the solar energy will be focused upon the collector 16. The collector 16 can be a cylinder having a diameter sized to give the desired temperature or the optimum diameter for the deflector 12 and reflector 14 misalignment.

The horizontally mounted deflector assembly can be used singularly or in combination with a number of other similar assemblies to power a powerhouse or any other energy utilizing system. Any standard tracking system known in the art can be used to "track" the sun as it moves through the sky. This tracking system rotates the vertical deflector 12 as the sun moves across the sky. Simultaneously, the angle of the vanes 24 are altered as the angle of the sun with respect to the earth at the point where the assembly is located is changed. FIG. 7 shows the angle of the vanes with respect to sun angles of 15°, 30°, 45° and 60°. The solar rays are deflected from its various angles and are directed vertically to the reflector assembly 14. These rays are then reflected off of the reflector assembly 14 and are collected by the collector 16. The collector is in thermal cooperation with the powerhouse to utilize and/or store the energy collected.

Without further analysis, the foregoing will so fully reveal the gist of the present invention that others can, by applying current knowledge, readily adapt it for various applications without omitting features that, from the standpoint of the prior art, fairly constitute essential characteristics of the generic or specific aspects of this invention and, therefore, such adaptations should and are intended to be comprehended within the meaning and range of equivalence of the following claims:

What I claim is:

1. A solar energy collection system comprising:
   (a) deflector means for receiving incident solar radiation and reflecting it downwardly in a vertical direction;
   (b) a reflector in the form of a paraboloid of revolution disposed beneath the deflector means for receiving the downwardly directed solar energy and reflecting it upwardly to a focus point; and
   (c) collector means at the focus point for collecting the solar energy; and
   (d) said deflector means including a plurality of moveable solar energy diverting vanes mounted on a plurality of cross beams which are positioned over the reflector and which extend as chords with respect to the reflector, the plurality of vanes being disposed between the cross beams, in rows perpendicular thereto.

2. A solar energy system in accordance with claim 1 further including means for changing the angles of said vanes.

3. A solar energy system in accordance with claim 2 wherein said means for changing the angles of said vanes includes:
   a drive shaft disposed across said deflector means;
   a means operatively connected to said drive shaft for powering said drive shaft;
   a drive chain operatively associated with each of said cross beams, each of said drive chains connected to said drive shaft;
   a plurality of vane position arms attached to and rotated by said drive chains;
   a plurality of vane position plates, each of said plates attached to one of said vane position arms; and
   flexible elongated means attached to each row of said vanes and said vane position plates for changing the angle of said plurality of vanes.

4. A solar energy system in accordance with claim 3 further including guide pins attached to each of said vane position plates and guide means in each of said cross beams, whereby said vane position plates are restricted to movement only in the vertical direction.

5. A solar energy system in accordance with claim 3 further including spring means attached between each of said vanes and said cross beams for tensioning said vanes.

6. A solar energy system in accordance with claim 3 further including adjustment bolts for maintaining said flexible elongated means in the current position.

7. A solar energy system in accordance with claim 2 wherein said means for changing the angles of said vanes includes:
   a drive spline shaft disposed across said deflector means;
   a means operatively connected to said drive shaft for powering said drive shaft;
   a drive chain operatively associated with each of said cross beams, each of said drive chains connected to said drive shaft;
   a plurality of van control arms attached to and extended and retracted by said drive chains; and
   a spring loaded roller means provided in each of said cross beams, each roller means being threaded by one of said diverting vanes for keeping each of said vanes at a predetermined tension and allowing said vanes to be extended in length by the unrolling of said vane from said roller means.

8. A solar energy system in accordance with claim 7 further including a protective cylinder surrounding said spring loaded roller means.

* * * * *